Jan. 3, 1950 W. R. ROSE 2,493,164
DUST CLOG INDICATOR
Filed Aug. 1, 1946
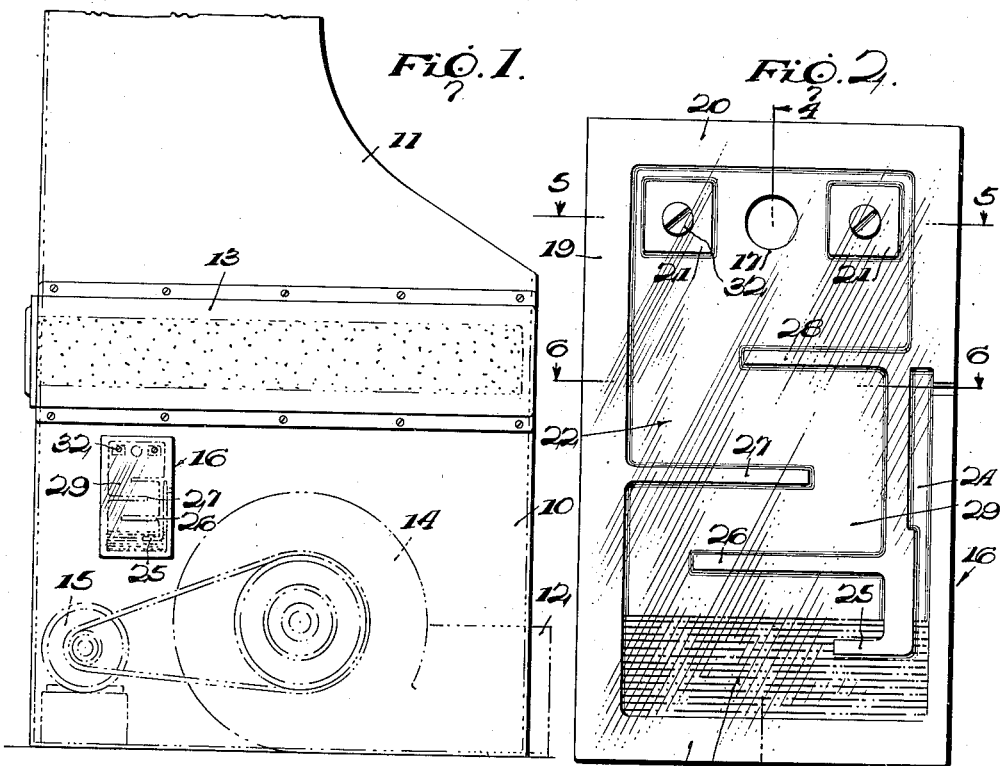
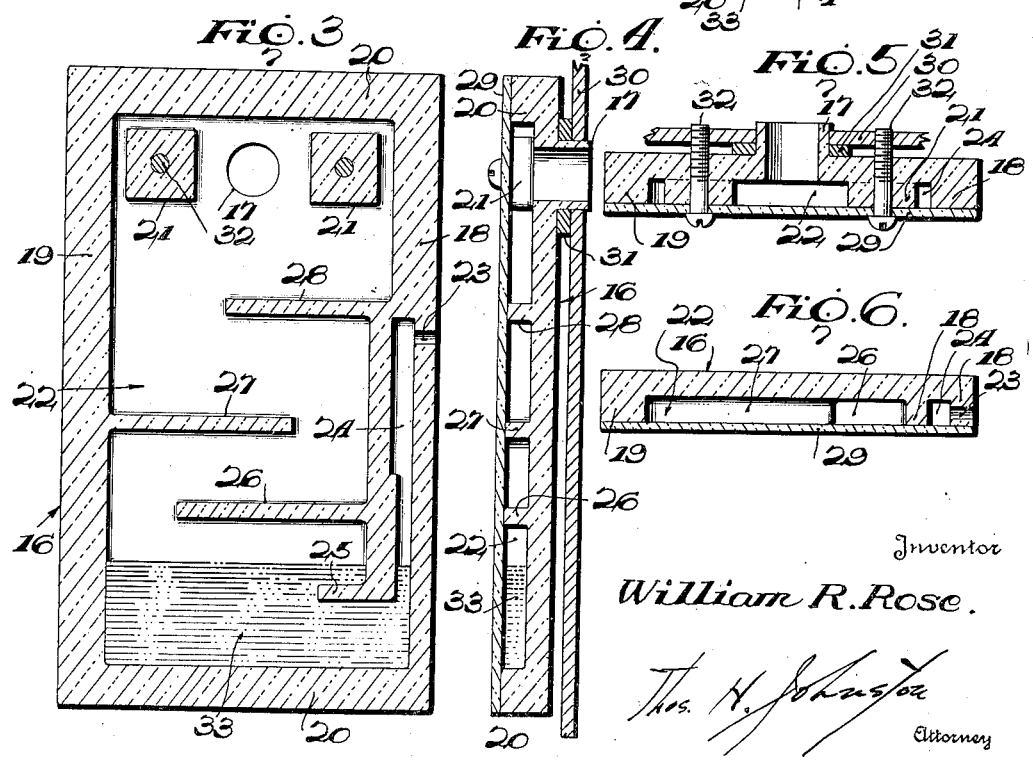
Inventor
William R. Rose.
Thos. H. Johnston
Attorney Patented Jan. 3, 1950

2,493,164

UNITED STATES PATENT OFFICE 2,493,164

DUST CLOG INDICATOR

William R. Rose, Arlington, Va.

Application August 1, 1946, Serial No. 687,788

5 Claims. (Cl. 116—117)

This invention relates to an improved dust clog indicator for the air filter screens of hot air furnaces.

In so far as I am aware, no visible indicator or other means is at the present time in use in conjunction with the filter screens of conventional circulatory hot air furnace systems to apprise the user of the furnace of such a system that the air filter screens of the furnace are, in any degree, clogged with dust. Rather, the user is told to install new screens every so often, or even periodically. The installation of new screens is thus overlooked or neglected, especially by persons not mechanically inclined sufficiently to tamper with the furnace, with the result that the filter screens become more and more clogged with dust until a condition is reached wherein the air fan is unable to circulate little, if any, air through the screens and through the system, so that the dwelling or building, as the case may be, becomes more or less chilly or cold at all times even though the burner of the furnace is obviously functioning satisfactorily.

The present invention, therefore, seeks to provide a device which will eliminate the necessity of periodic inspection by the user of the air filter screens themselves, and which will visibly indicate whether or not the screens are clogged with dust.

A further object is to provide a device which will visibly indicate, more or less roughly, just about how badly the filter screens are clogged.

And the invention seeks, as a still further object, to provide a device which will be simple and cheap, and which may be readily applied to furnaces already in use as well as new furnace installations.

Other and incidental objects of the invention will appear during the course of the following description, and in the drawings:

Figure 1 is a side elevation showing my improved device applied to a conventional hot air furnace.

Figure 2 is a detail front elevation of the device.

Figure 3 is a vertical longitudinal section.

Figure 4 is a section on the line 4—4 of Figure 2.

Figure 5 is a section on the line 5—5 of Figure 2.

Figure 6 is a section on the line 6—6 of Figure 2.

Referring now more particularly to Figure 1 of the drawings, I have shown my improved indicator in conjunction with a conventional hot air furnace having a fan chamber 10, an air return inlet duct 11, and a hot air outlet duct 12. Removably mounted at the upper portion of the chamber 10 are one or more approved air filter screens 13, and mounted within the lower portion of said chamber is a suitable air fan 14 driven by a motor 15 for circulating air through the screens 13 and through the heating system of which the furnace is a part. As will be well understood, cooled air from the rooms of the building serviced by the furnace is drawn by the fan 14 through the duct 11 and through the screens 13 into the chamber 10, and thence discharged by the fan from said chamber through the duct 12. It has been deemed unnecessary to show any means for heating the air.

All of the foregoing structure as well as the operation thereof is well known in many variations in the art, and it is therefore unnecessary to go into a showing or description of detail other than the general disclosure outlined. However, it should be noted that one of the prevailing difficulties experienced in connection with all such installations arises through the fact that the screens 13 become, incident to continued use of the furnace, as, for instance, during a winter, more and more clogged with dust until a condition is reached such that the fan 14 cannot draw air through said screens in any appreciable degree. Under such a condition, the fan continues to operate as does also the burner of the furnace, while the rooms of the building remain chilly or cold.

In carrying the present invention into effect, I employ an oblong base block 16 which is preferably formed of glass. However, if found expedient, the base block may be formed of metal, or synthetic material either transparent or non-transparent. The base block is flat at its rear side, and projecting from the upper end portion thereof medially of the block is a nipple 17. At its forward side, the block is provided with side walls 18 and 19 respectively, as well as with end walls 20, and formed on the bottom wall of the block at opposite sides of the nipple 17 are spacing bosses 21.

As will be seen, the side walls 18 and 19 in conjunction with the end walls 20 provide a chamber 22, and formed in the side wall 18 is an air inlet opening 23 communicating with a longitudinal passage 24 in said wall. The passage 24 opens into the chamber 22 near the lower end thereof, and extending laterally from the mouth of said passage is a more or less short horizontal baffle 25, the lower face of which may be horizontal, as shown, or slightly inclined upwardly, if so desired.

Extending horizontally from the side wall 18 of the block 16 above the baffle 25 is a longer baffle 26, above which is a like baffle 27 extending from the side wall 19 of the block, and arranged above the baffle 27 is an overhanging baffle 28 extending from the side wall 18. All of the baffles are preferably integral with the base block and of the same material.

Overlying the side and end walls of the base block 16 is a cover plate 29 abutting the bosses 21. Regardless of whether or not the base block is transparent or non-transparent, the cover plate is, in any event, of transparent material and may be formed of glass or approved synthetic substance. Preferably, the cover plate is secured in place by a suitable cement, or otherwise mounted in position to seal the cover plate air-tight, and likewise close the chamber 22 at its forward side. Conceivably, the cover plate could be fused in position.

In devising the device, effort has been made to render the attachment thereof to the furnace as simple as possible. As shown in Figure 4, it is only necessary to provide a wall 30 of the fan chamber 10 with an opening to receive the nipple 17, a gasket 31 around the nipple being preferably employed, and extending through the cover plate 29 and through the bosses 21 are cap screws 32 engaged through said wall for detachably securing the device in operative position. Thus, communication is established, by means of the nipple 17, between the fan chamber 10 of the furnace and the chamber 22 of the base block 16.

In use, the lower portion of the chamber 22 of the device is partially filled by a pool of suitable liquid, indicated at 33. Water may be employed, although a more viscous liquid, or other liquid less subject than water to evaporation may well be used. In any event, the pool of liquid 33 is at a level, normally, say half-way between the baffles 25 and 26, and may be replenished by introducing additional liquid through the opening 23.

Assuming now that the fan 14 of the furnace is in operation and that the screens 13 are new to permit unimpeded flow of air therethrough, the indicator, as above described, will be unaffected. However, as the screens 13 become clogged with dust, the suction effort of the fan 14 will be communicated through the nipple 17 to the chamber 22 of the base block 16. Consequently, as the screens 13 become more and more clogged with dust and the suction effort of the fan becomes more and more pronounced, air will be drawn in through the opening 23 and through the passage 24 to emerge along the under surface of the baffle 25 in a series of bubbles, indicating that the screens are in proportionate degree clogged. At the inception of the clogging of the screens such as to reflect in a proportionate suction effort of the fan 14, the bubbles of the stream of bubbles along the under surface of the baffle 25 are spaced more or less wide apart and the motion thereof is slow and hesitating. However, as the screens become still more clogged, the motion of the stream of bubbles is quickened proportionately, and the bubbles become more and more closely spaced relative to each other until, when the screens are practically impervious to the passage of air therethrough, the stream of bubbles is very rapid in motion and uninterrupted, while the bubbles of the stream are close together. Thus, by observing through the cover plate 29, the presence or absence of a stream of bubbles rising through the pool of liquid 33, as well as the spacing of the bubbles of the stream and the rapidity of motion thereof, the user may determine whether or not the screens 13 are clogged with dust, and, if any, just about how badly clogged. The baffles 26, 27, and 28 are provided as a safeguard to prevent liquid from the pool 33 from being sucked upwardly through the nipple 17 into the fan chamber of the furnace.

Having thus described my invention, I claim:

1. A clog indicator for the air filter screen of a furnace having a stream of air drawn by a fan through said screen, said indicator including means providing an air intake, and means adapted to interpose a pool of liquid between said air intake and said air stream submerging a portion of said air intake whereby to provide bubbles of air rising through said pool of liquid as said screen becomes clogged and the suction effort of the fan is thereby increased.

2. A clog indicator for a furnace air filter screen including a base block providing a chamber and having an air inlet passage entering said chamber, a cover plate closing said chamber to receive a pool of liquid submerging the mouth of said passage, and means for operatively connecting said chamber with a furnace whereby air will be drawn in through said inlet passage to rise through said liquid and form bubbles as said screen becomes clogged.

3. A clog indicator for a furnace air filter screen including a base block providing a chamber and having an air inlet passage entering said chamber, a cover plate closing said chamber to receive a pool of liquid submerging the mouth of said passage, and means for operatively connecting said chamber with a furnace whereby air will be drawn in through said inlet passage to rise through said liquid and form bubbles as said screen becomes clogged, a portion of said cover plate being transparent to afford a view of said bubbles.

4. A clog indicator for a furnace air filter screen including a base block providing a chamber and having an air inlet passage entering said chamber, a cover plate closing said chamber to receive a pool of liquid submerging the mouth of said passage, and a nipple carried by the base block to communicate with said chamber and adapted to operatively connect said chamber with a furnace whereby air will be drawn in through said inlet passage to rise through said liquid and form bubbles as said screen becomes clogged.

5. A clog indicator for a furnace air filter screen including a base block having side and end walls providing a chamber, one of said walls being formed with an air inlet passage entering said chamber and the block being provided with a baffle near the mouth of said passage, a cover plate abutting said side and end walls and closing said chamber to receive a pool of liquid submerging the mouth of said passage, and a nipple carried by the base block to communicate with said chamber and adapted to operatively connect said chamber with a furnace whereby air will be drawn in through said inlet passage to travel along the under surface of said baffle and rise through said liquid to form bubbles as said screen becomes clogged, a portion of said cover plate being transparent to afford a view of said bubbles.

WILLIAM R. ROSE.

REFERENCES CITED

The following references are of record in the file of this patent:

UNITED STATES PATENTS

| Number | Name | Date |
|---|---|---|
| 1,959,759 | Hultberg | May 22, 1934 |
| 2,013,136 | Cornelius | Sept. 3, 1935 |